Aug. 2, 1938.   T. MORELLI   2,125,389
ANTICANNIBALISM GUARD FOR CHICKENS
Filed Dec. 12, 1936

Inventor
Tito Morelli
By Charles L. Reynolds
Attorney

Patented Aug. 2, 1938

2,125,389

UNITED STATES PATENT OFFICE 2,125,389

ANTICANNIBALISM GUARD FOR CHICKENS

Tito Morelli, near Kirkland, Wash.

Application December 12, 1936, Serial No. 115,552

6 Claims. (Cl. 119—97)

Cannibalism among fowls is a term generally used to describe the tendency which develops among flocks for one or several fowls to pick at the egg vent of another fowl. This results in pulling out the oviduct, and the injured hen dies. Losses from this cause alone often amount to 20% of the laying fowls in a flock.

This tendency develops usually during the early fall, when the flock is first brought into a confined pen, and becomes restive, after having been permitted to roam at large or in a less confined space throughout the summer. The young pullets, bred for egg-productivity, have by then commenced to lay heavily, and so frequently does the individual pullet lay that sometimes eggs are laid prematurely, resulting in soft-shelled eggs. This is a strain upon the pullet and may in itself result in temporary injury to the egg vent or the oviduct which in itself may attract other fowls and cause them to pick, but primarily it seems this picking occurs because other hens, picking at the soft-shelled egg, acquire a taste for such eggs, and commence to pick at the egg while it is in the course of being laid. As mentioned, this laying of soft-shelled eggs is an abnormal act and strains the pullet, and requires considerably longer time than usual. Accordingly in their eagerness to pick at a soft-shelled egg, and during the time when the laying is in progress, the hens of a flock will peck at a pullet in the act of laying such eggs, with the result that the pullet is injured in the manner indicated. Whatever may be the reason, it occasions large losses, and especially among the younger pullets just beginning to lay in quantity.

Various devices have been proposed to obviate this tendency, as for example blinders mounted upon the beak of the hens, so that they may not see to peck, but such blinders obscure their vision for other purposes, as for instance in feeding, and a hen wearing such a blinder learns how to see over or around it, and it has been found that it does not eliminate a substantial loss from picking. Other devices have been proposed in the nature of a guard disposed in front of the beak and hinged by a pin through the nostrils, so that when the hen's head is normally upright it will prevent the wearer from picking at other hens, and while this has proven quite satisfactory in use, in that it has materially reduced the losses from picking, it has other drawbacks in that having but limited movement with relation to the beak of the wearer, and that purely a hinging movement, it interferes to some extent with feeding, and, more important, tends to act as a tamper, thereby tamping down and hardening the mash upon which the fowls feed; in addition, it becomes clogged with mash or other feed so that it must be cleaned out from time to time or it commences to ferment, and further, when thus clogged, it can no longer fall into normal position in front of the beak to prevent picking.

It is a primary object of the present invention to provide a device which will efficiently serve as a guard to prevent picking when the wearer's head is held normally upright, which is unlikely to clog by reason of its position with relation to the beak while the fowl is feeding, and because of a certain freedom of movement it has with respect to the beak, and which is substantially self-cleaning.

It is a further object to provide a device having the advantages named, which can be cheaply manufactured, and easily applied to the hen, and one which will in no way obscure the normal vision of the hen that wears it.

My invention therefore comprises the novel parts, and the novel combination and arrangement thereof, for the purpose specified, namely, preventing what is called cannibalism in fowls, as shown in the accompanying drawing, and as will be more particularly described in this specification and defined by the claims which terminate the same.

In the accompanying drawing I have shown my invention embodied in a form which is at present preferred by me, it being understood that the principles of my invention may be incorporated in other forms, within the scope of the claims.

Figure 1:
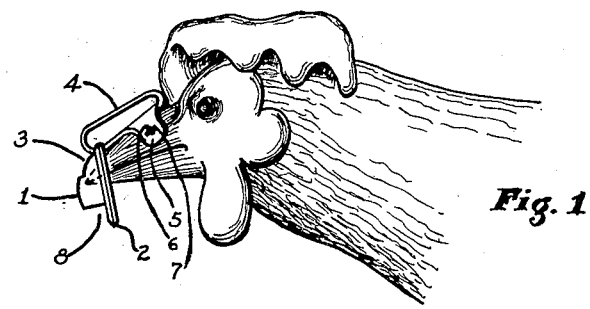
Figure 1 is an elevation of the head of a hen with my device applied to her beak, the head being in the normal upright position.
Figure 3:
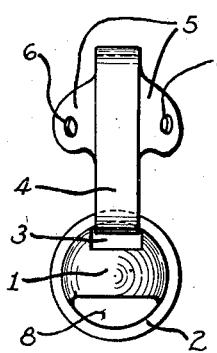
Figure 3 is a front elevation of the device ready for application to a hen.

In Figure 1 the hen's head is shown in the normal upright position, or perhaps thrust forwardly somewhat, as it would be when picking at the egg vent of another hen. The shield preferably consists of a dome-shaped guard 1, preferably of generally circular shape as seen in front elevation (see Figure 3), having a complete marginal rim 2. It is provided with a slot 3 which extends from its upper portion, within the marginal rim, to a point near the center of the dome. By the provision of such a slot it may be suspended by a closed, flattened loop 4 received in the slot 3, and provided with means to support it upon the upper mandible of the fowl's beak. Such means may consist of the ears 5, each having an aperture 6, through which may be passed a pin 7, the pin passing also through the nostrils and piercing the membrane therebetween, as is commonly done in applying such devices to the beaks of fowls.

Thus supported, with the fowl's head in normal upright position the guard hangs by gravity at the lower end of the flattened loop 4, immediately in front of the end of the beak. The loop 4 is narrow and does not disturb the fowl's vision, and there is nothing else upstanding in front of her eyes.

In pecking at the egg vent of another hen the hen's beak is thrust forwardly, the head being held substantially in the attitude shown in Figure 1. It follows that the guard 1 will remain in the position there shown, and that the beak, being covered, cannot peck at the other hen, for there is interposed between the beak and the flesh of the other hen the guard 1. As a result pecking is prohibited by this guard.

Figure 2:
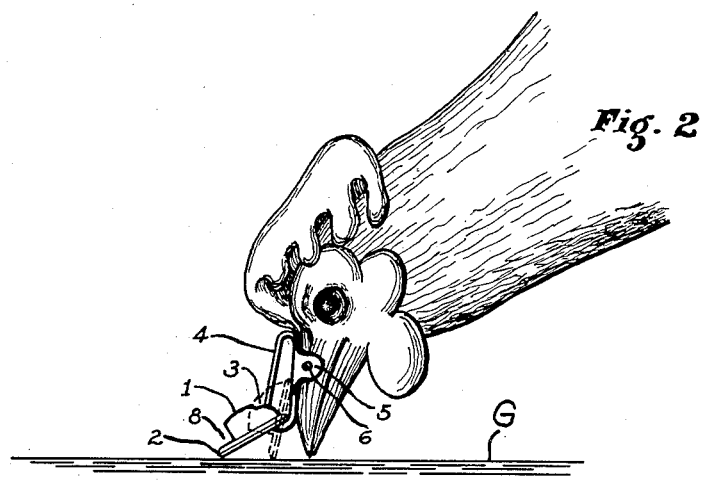
Figure 2 is a similar view of the head of a fowl with my device applied to the beak, showing the head lowered in the normal position of feeding.

In eating, however, the hen's head is lowered into the position shown in Figure 2, and in this position the lower edge of the marginal rim 2 contacts with the ground G and usually will cause the guard to hinge about the lower end of the loop, as shown in full lines in Figure 2, or in some instances the guard may be held in a nearly upright position, the loop 4 being moved downward through the slot 3, as shown in dotted lines in Figure 2. In either such position the guard does not obstruct the action of feeding, yet will swing into guarding position when the wearer's head is lifted again.

It is particularly desired to point out that the guard does not at any time come down flat upon the surface of the ground during feeding, and moreover, it has a certain amount of movement longitudinally as well as swingably with relation to the loop 4. By reason of these facts there is no tendency for the guard to tamp down wet mash, as occurs in some other types of guards which are more rigidly or directly connected to the beak, and when this mash is tamped down it becomes hard and it is difficult for the chicken to eat it, and moreover, it may become packed on the inside of the guard. According to my invention I prefer that the guard be formed with an aperture 8 in its lower portion. This portion which comes into contact with the ground is thus left open to the fullest possible extent, so that feed may pass freely through the aperture and will not pack therein, or if it should tend to pack it is easily broken up or, being softened by water into which the chicken dips its bill in drinking, it will fall through the aperture or out of the interior of the dome.

Experience with this device has shown it to be 100% successful. I have used it on some twenty-five hens over a period of about one year, during which time it was in place on these hens for a total of six months. It has been tried on a larger scale with a pen of 250 hens, and it was left upon them for three months, immediately after they were confined in relatively small pens. During all this time, and with each such flock, there has been not a single loss from picking, whereas with other hens not so equipped losses from such a source have been from 20% to 25%. It has been found self-cleaning in use, and readily adaptable to beaks of different lengths, for the beaks of chickens vary in length or grow as do fingernails of a human being. It can be adjusted by fattening or flattening the loop 4, the metal of which is easily shaped, so that it is readily adaptable to different lengths of beak.

What I claim as my invention is:

1. A device for the purpose specified, comprising a guard adapted for disposition surrounding the front end of a chicken's beak, and a member formed for attachment to the upper mandible, and engaging the guard at a single point to swingably support the latter pendant in such position when the chicken's head is normally upright, the guard and said member being relatively formed and arranged to guide the guard for forward and backward swinging movement but to restrain substantial relative sidewise movement, and for bodily movement lengthwise of the beak.

2. A device for the purpose specified, comprising a dome-shaped guard adapted for disposition surrounding the front end of a chicken's beak, having a slot extending downward from a point adjacent to its upper edge, a loop extending lengthwise above and having means for attachment to the upper mandible, passing through said slot and constituting the sole means to support the guard pendant in the position specified when the chicken's head is normally upright, and guiding the guard for swinging movement or for movement lengthwise of the beak when its lower edge contacts the ground as the chicken's head is moved downwardly, as in feeding.

3. A device for the purpose specified, comprising a dome-shaped guard adapted for disposition surrounding the front end of a chicken's beak, having a slot extending downward from a point adjacent its upper edge, a loop extending lengthwise above and having means for attachment to the upper mandible, passing through said slot and constituting the sole means to support the guard pendant in the position specified when the chicken's head is normally upright, and guiding the guard for swinging movement or for movement lengthwise of the beak when its lower edge contacts the ground as the chicken's head is moved downwardly, as in feeding, said loop being of a width substantially equal to the width of the slot wherein it is received, whereby sidewise swinging of the guard is largely prevented.

4. A device for the purpose specified, comprising a guard having a substantially circular marginal rim, and a dome rising therefrom, and having a slot in the dome extending from the rim downwardly to a point adjacent the center, and a drain aperture in the lower portion of the dome, a generally flat, elongated loop, passing through the slot in the dome, and of substantially the same width, whereby the guard is swingably suspended by the rim from said loop, without material sidewise swinging, and may be slid lengthwise the loop, and means to secure the loop above and extending lengthwise of the upper mandible, to dispose the guard, when the chicken's head is normally upright, in front of and surrounding the front end of the beak.

5. A device for the purpose specified, comprising a guard, an elongated loop adapted for securement above the upper mandible of a fowl, extending lengthwise, the guard having an aperture in its upper portion only, wherein the loop is received, to support the guard for forward and backward swinging movement, when at the outer end of the loop, in front of the beak, and for sliding movement lengthwise of the loop and beak, upon contact of the lower edge of the guard with the ground, and the guard and loop being so proportioned that the guard, when thus slid along the loop, leaves the beak free for picking up from the ground.

6. A device for the purpose specified, comprising a guard adapted for disposition surrounding the front end of a chicken's beak, having a slot extending vertically downward from a point within and near its upper margin, and means adapted for attachment to the upper mandible, of a width substantially equal to the width of such slot, and received within the slot to swingably support the guard for forward and backward swinging movement, without substantial sidewise swinging movement, or for bodily movement lengthwise of the beak, when the guard's lower edge contacts the ground as the chicken's head is moved downwardly, as in feeding.

TITO MORELLI.